(12) United States Patent
Willens et al.

(10) Patent No.: US 12,000,747 B2
(45) Date of Patent: Jun. 4, 2024

(54) WEARABLE MULTI-DIRECTIONAL BLAST SENSOR

(71) Applicant: Advanced Materials and Devices, Inc., Reno, NV (US)

(72) Inventors: Kyle Willens, Carson City, NV (US); Blake Muzinich, Reno, NV (US); Barkan Kavlicoglu, Reno, NV (US); Faramarz Gordaninejad, Reno, NV (US)

(73) Assignee: Advanced Materials and Devices, Reno, NV (US)

( * ) Notice: Subject to any disclaimer, the term of this patent is extended or adjusted under 35 U.S.C. 154(b) by 283 days.

(21) Appl. No.: 17/723,995

(22) Filed: Apr. 19, 2022

(65) Prior Publication Data

US 2023/0047652 A1 Feb. 16, 2023

Related U.S. Application Data

(60) Provisional application No. 63/231,380, filed on Aug. 10, 2021.

(51) Int. Cl.
*G01L 5/14* (2006.01)
*G01L 5/16* (2020.01)
*G01L 19/14* (2006.01)

(52) U.S. Cl.
CPC . *G01L 5/14* (2013.01); *G01L 5/16* (2013.01)

(58) Field of Classification Search
CPC ......... G01L 5/14; G01L 23/00; G01L 5/0052; G01L 19/0092; G01L 19/0609; G01L 19/0636; G01L 19/0681; G01L 19/083
See application file for complete search history.

(56) References Cited

U.S. PATENT DOCUMENTS

| 3,499,311 A | 3/1970 | Lankford |
| 4,787,246 A * | 11/1988 | Komatsu ................. G01P 15/06 |
| | | 73/862.53 |

(Continued)

OTHER PUBLICATIONS

Helen Phipps et al., Characteristics and Impact of U.S. Military Blast-Related Mild Traumatic Brain Injury: A Systematic Review; Frontiers in Neurology, Nov. 2020, vol. 11, Article 559318.

(Continued)

*Primary Examiner* — Andre J Allen
(74) *Attorney, Agent, or Firm* — Kenneth D'Alessandro (57) ABSTRACT

A wearable blast sensor for simultaneously measuring blast pressure from multiple directions includes multiple pressure sensing transducers oriented in individual planes for simultaneously measuring blast pressure of a blast from multiple directions, at least one blast parameter sensing transducer to measure a blast parameter, a memory for storing blast pressure data and measured blast parameter data, a controller coupled to and responsive to the multiple pressure sensing transducers and to the blast parameter sensing transducer to capture and store measured blast pressure data and measured blast parameter data, at least one indicator to indicate blast exposure severity as a function of amplitude of measured blast pressure data and measured acceleration amplitude, the multi-directional pressure sensor device, the blast parameter sensing transducer, the memory, the controller, and the indicator light and/or display sealed within in a housing, and at least one attachment device coupled to the housing for mounting.

26 Claims, 7 Drawing Sheets

(56) References Cited

U.S. PATENT DOCUMENTS

| | | | |
|---|---|---|---|
| 6,032,538 | A | 3/2000 | Rickman |
| 7,162,919 | B1 | 1/2007 | Randolph |
| 7,992,421 | B2 | 8/2011 | Jeftic-Stojanovski |
| 8,397,551 | B2 * | 3/2013 | King .................. G01L 5/14 |
| | | | 73/35.14 |
| 8,984,664 | B2 | 3/2015 | Moss |
| 9,568,389 | B2 | 2/2017 | Wong |
| 11,668,614 | B2 * | 6/2023 | Willens ............. G01L 19/147 |
| | | | 73/756 |
| 2010/0275676 | A1 | 11/2010 | King |
| 2010/0326192 | A1 | 12/2010 | Petelenz |
| 2015/0143875 | A1 | 5/2015 | Wong |
| 2016/0027275 | A1 | 1/2016 | Bernhardt |
| 2016/0097756 | A1 | 4/2016 | Borkholder |
| 2021/0355813 | A1 * | 11/2021 | Crowell ................ G01L 5/14 |
| 2022/0317145 | A1 * | 10/2022 | Bartsch ................. F41H 1/00 |

OTHER PUBLICATIONS

Ann McKee et al., Military related traumatic brain injury and neurodegeneration, Alzheimer's & Dementia: the Journal of the Alzheimer's Association, Jun. 2014, pp. S242-S251.

* cited by examiner

WEARABLE MULTI-DIRECTIONAL BLAST SENSOR

BACKGROUND

Explosions can cause bodily and nerve system injuries. Traumatic Brain Injury (TBI) and Post-Traumatic Stress Disorder (PTSD) are well-known blast-related injuries. Lung and other internal organ injuries are other types of polytrauma sustained by persons exposed to blast.

There exist only a few wearable sensors known to the art that measure and record blast pressure exposure. None of the prior art devices can measure blast pressure in multiple directions because they are unidirectional. Prior art blast sensors have high directional sensitivity, insufficient sampling rates, low resolution, and poor ingress protection. Prior art blast sensors such as the one disclosed in U.S. Pat. No. 9,568,389 operate at insufficient sampling frequencies (as low as 24 kHz) to capture enough fidelity of blast pressure data to make injury determinations on peak pressure and pressure impulse. Additionally, the power conservation operational mode that would be used for long field deployments is not appropriate for accurately capturing blast wave exposure data. U.S. Pat. No. 9,568,389 relies on powering an accelerometer with logic to wake up the higher power pressure sensor upon exceeding 10 g of acceleration produced from a blast event. Because of a 24 kHz sampling rate and the latency involved with powering up the pressure sensor and circuitry, accurately capturing the near-instantaneous pressure rise of a blast event for peak pressure recording and pressure impulse calculations is not possible. The present invention, a wearable multi-directional blast sensor (MDBS), is designed to be wearable, lightweight, rechargeable, rugged, and collect accurate data for blast events.

BRIEF SUMMARY OF THE INVENTION

Using an MDBS, medical professionals can have access to accurate blast pressure exposures to input into or generate a medical database correlating the acute and cumulative effects of blast exposure on individuals. The MDBS is accompanied by a software tool that provides blast overpressure histograms, peak pressures, pressure impulses, acceleration histograms, peak accelerations, and other statistics of a recorded blast event.

The MDBS in accordance with the present invention provides a multi-directional blast sensing capability that can be placed on personnel, animals, structures, and vehicles (unmanned or manned) to measure, record, indicate/display, and report exposure severity. The recording of blast events is triggered by at least one sensor based on predetermined thresholds preprogrammed by the user or set from the factory for at least one parameter of a blast wave. Other methods of triggering blast event recording can include artificial intelligence/machine learning based on a single parameter or multiple parameters of a blast.

Parameters of a blast event that can be measured in accordance with the present invention include, but are not limited to, pressure and acceleration measurements over the duration of the blast event. Pressure measurements are performed by a plurality of pressure sensors in one device, and a resultant pressure and directionality of the blast with respect to the MDBS can be determined.

One aspect of the MDBS of the present invention is the ability to measure blast pressure from multiple directions, in three-dimensional space, by utilizing more than one pressure sensor in a single device. Pressure sensors may be oriented such that at least one pressure sensor measures the reflected pressure of a blast if it is parallel to the blast front, and at least one pressure sensor measures the incident pressure of a blast if is oriented perpendicular to the blast front.

According to another aspect of the invention, one parameter of a blast that is measured by the MDBS of the present invention is pressure.

According to another aspect of the invention, one parameter of a blast that is measured by the MDBS of the present invention is acceleration.

According to another aspect of the invention, an analysis of the pressure and impulse history from each pressure sensing element contained in the device is used to determine a resultant pressure and directionality of the blast with respect to the MDBS.

According to another aspect of the MDBS event recording is triggered when at least one predetermined threshold parameter of a blast wave is exceeded or with an artificial intelligence/machine learning-based trigger based on a single parameter or multiple parameters of a blast.

According to another aspect of the invention, the MDBS utilizes a rolling memory buffer to capture pre- and post-trigger blast data.

According to another aspect of the invention is that the level of blast exposure is indicated/displayed or alerted based on at least one parameter of a blast with at least one colored indicator light, and/or a digital display, and/or a sound source, and/or a tactile feedback source present on the invention with thresholds either preprogrammed and adjustable by the user or set from the factory.

According to another aspect of the invention is that data measured by at least one sensing element for at least one parameter of the blast wave is saved to be downloaded by another device for postprocessing.

According to another aspect of the invention, blast data is processed on the MDBS (i.e. computing at the edge).

According to another aspect of the invention, the reduction/elimination of false blast event triggers is accomplished with the use of artificial intelligence/machine learning algorithms that trigger based on a parameter(s) of a blast wave.

DETAILED DESCRIPTION

Persons of ordinary skill in the art will realize that the following description is illustrative only and not in any way limiting. Other instances of the invention will readily suggest themselves to such skilled persons.

The present invention is particularly useful for sensing and recording parameters of a blast, indicating the severity of the event, and storing the data for post-event analysis. The MDBS includes multiple pressure sensors and at least one activation sensor which may be, for example, a multi-axis accelerometer. The pressure signals are conditioned and then processed with a microcontroller (MCU). The amplitude and time history of multiple pressure sensors and at least one other sensing element to measure a parameter such as acceleration is used for the calculation of a blast severity metric, such as pressure impulse. The pressure sensors can be made of various materials and/or microelectromechanical systems (MEMS) including, but not limited to, a piezoelectric, piezoresistive, capacitive, diaphragm, or strain-gage based sensing element(s). The activation sensor may be an accelerometer(s) or may also be made using various material systems and MEMS including, but not limited to, a piezoelectric, piezoresistive, or capacitive type(s).

In a fixed power operation mode in which power is supplied by either an internal battery or by an external power source, power is continually provided to all pressure sensors. In a battery operation mode, the MCU in the MDBS wakes up in response to a signal from an activation sensor indicating that the MDBS is being worn by a user or moving in a vehicle, and power is provided to all pressure sensors. While the MCU is active, output data from all sensors are written into a rolling memory. After a blast is sensed, recording is triggered and stored in non-volatile memory. The recorded blast data can be processed in the MCU or can be downloaded and post-processed after the event to determine the blast exposure severity. The quantitative amplitude of at least one blast parameter can be displayed with an indicator light and/or a digital display. The maximum pressure recorded by any of the pressure sensors (or an average or other mathematical computation of any combination, or all measured pressures), may be displayed.

Processed data is recorded to a blast event memory which can be written to and read via either wired or wireless communication. In some instances of the invention, the blast event memory is co-located within the housing of the wearable blast sensor. In other instances of the invention, the blast event memory is located outside of the housing of the wearable blast sensor. Power consumption of the wearable blast sensor is minimized by utilizing low-power modes on the MCU and powering the pressure sensors only when the MDBS is in use.

The pressure history of all pressure sensors in the MDBS as well as the data history from other blast parameter sensors in the MDBS is analyzed and, at a minimum, the peak pressure and pressure impulse from all pressure sensors are calculated. A resultant pressure and directionality of the blast with respect to the MDBS can be determined with an analysis of the pressure history of each pressure sensor.

Figure 1:
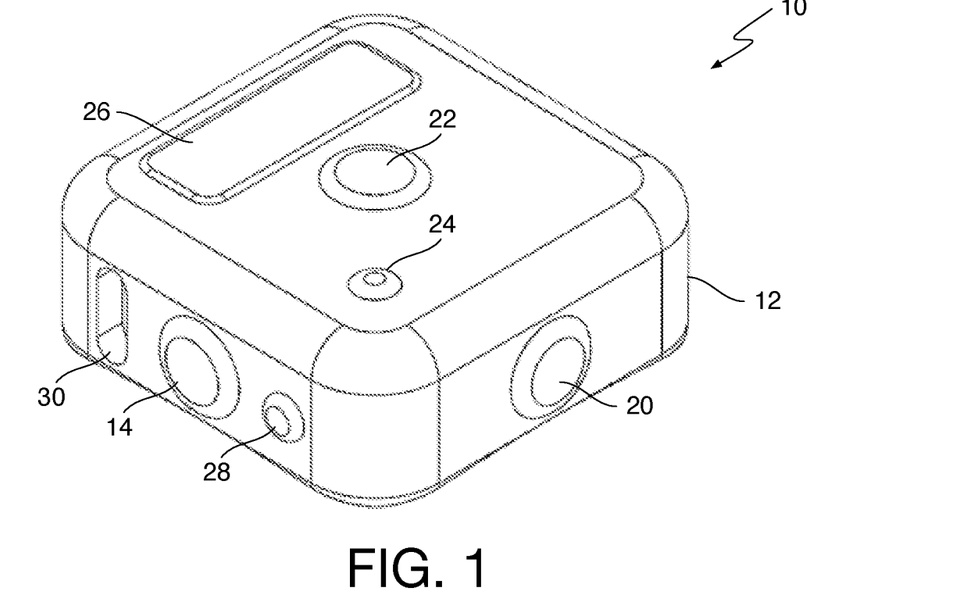
FIG. 1 is an isometric view illustrating an example instance of the wearable multi-directional blast sensor that is used for sensing blast pressure and acceleration.
Figure 2:
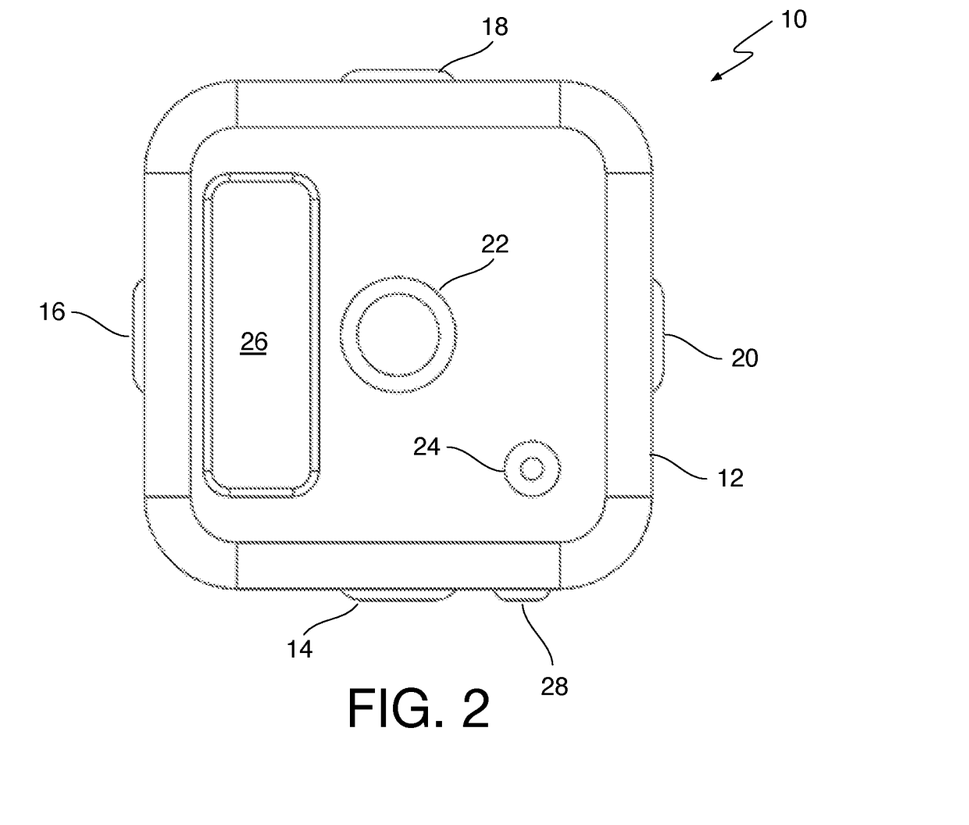
FIG. 2 is a top view of the wearable multi-directional blast sensor of FIG. 1 that is used for sensing blast pressure and acceleration.

An illustrative instance of the MDBS 10 of the present invention is shown in an isometric view in FIG. 1 and in a top view in FIG. 2. The MDBS 10 is disposed in a housing 12 formed from a rugged material that can be, for example, directly molded over all electronics components and sensors, attached and sealed via ultrasonic welding or other methods, bolted with sealing gaskets or a seal system, glued with adhesive, or sealed with an interference or snap-fit.

As may be seen from FIGS. 1 and 2, the MDBS 10 includes multiple pressure sensors oriented in multiple planes to capture blast pressure from multiple directions. In the illustrative example shown in FIGS. 1 and 2, there is a pressure sensor disposed on the front 14, left 16, rear 18, right 20, and top 22 of the MBDS 10. Persons of ordinary skill in the art will appreciate that while the instance of the invention illustrated in FIGS. 1 and 2 includes five pressure sensors 14, 16, 18, 20, and 22, other instances of the invention may contain fewer pressure sensors or a larger number of pressure sensors. The material surrounding the pressure sensors 14, 16, 18, 20, and 22 should have an acoustic impedance that minimally impedes the blast pressure propagation to the pressure sensor and limits electromagnetic interference and other noise to the sensors. Materials which have these characteristics may be of a metallic, polymeric (e.g., polyurethane), or composite type.

A blast indicator 24 provides a sensory indication that a blast has been sensed. The sensory indication may be one or more of visual, audible or tactile in the form of, for example, a light emitting diode (LED), a sound such as an audible beep or buzzer, or a mechanical impulse or vibration. In some instances of the invention, the sensory indication may be a multi-level sensory indication to indicate the severity of the blast. In one non-limiting instance of the invention, three blast severity levels may be represented by, for example, display of a different color (e.g., red, green, blue (RGB) LED) or short, medium or long blinking, different sound characteristic (e.g., one, two, or three, or short, medium or long audible beeps or buzzes), or different mechanical vibration characteristic (e.g., one, two, or three, or short, medium or long mechanical vibrations) as a function of the amplitude of at least one parameter measured from at least one sensing element during a blast event. The different sensory indications which correspond to different levels of at least one sensed blast parameter amplitude can be programmed and set by the user, or pre-programmed as shipped from the factory. A digital display 26 can indicate and display blast exposure amplitude along with other information such as battery life, MDBS mode, and sensor states. A button switch 28 is used for powering the sensor on and off, or for switching between different operating modes. Operating modes can also be switched automatically when a threshold of at least one blast parameter is exceeded to minimize power consumption. The housing 12 contains a USB port 30 for the wired USB connection to the sensor.

Figure 3:
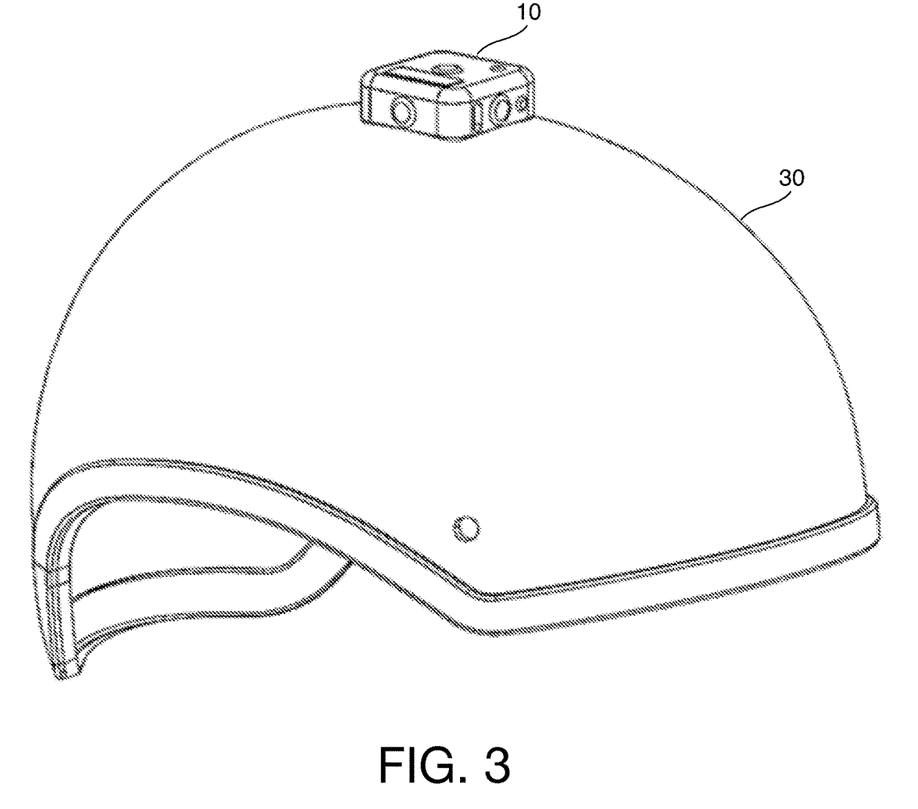
FIG. 3 is an isometric view of an example instance of the wearable multi-directional blast sensor attached to a helmet.

As shown in FIG. 3, the MDBS 10 is wearable by a user and can be affixed, for example, to a helmet 30 where it is unobstructed for measuring blast pressure. The MDBS 10 can be attached to the helmet 30, or to another object such as, but not limited to a human or animal body, vehicle, or structure using adhesive, hook-and-loop fastener, straps, elastic ties, mechanical fasteners, or other attachment methods (not shown in FIG. 3).

Figure 4:
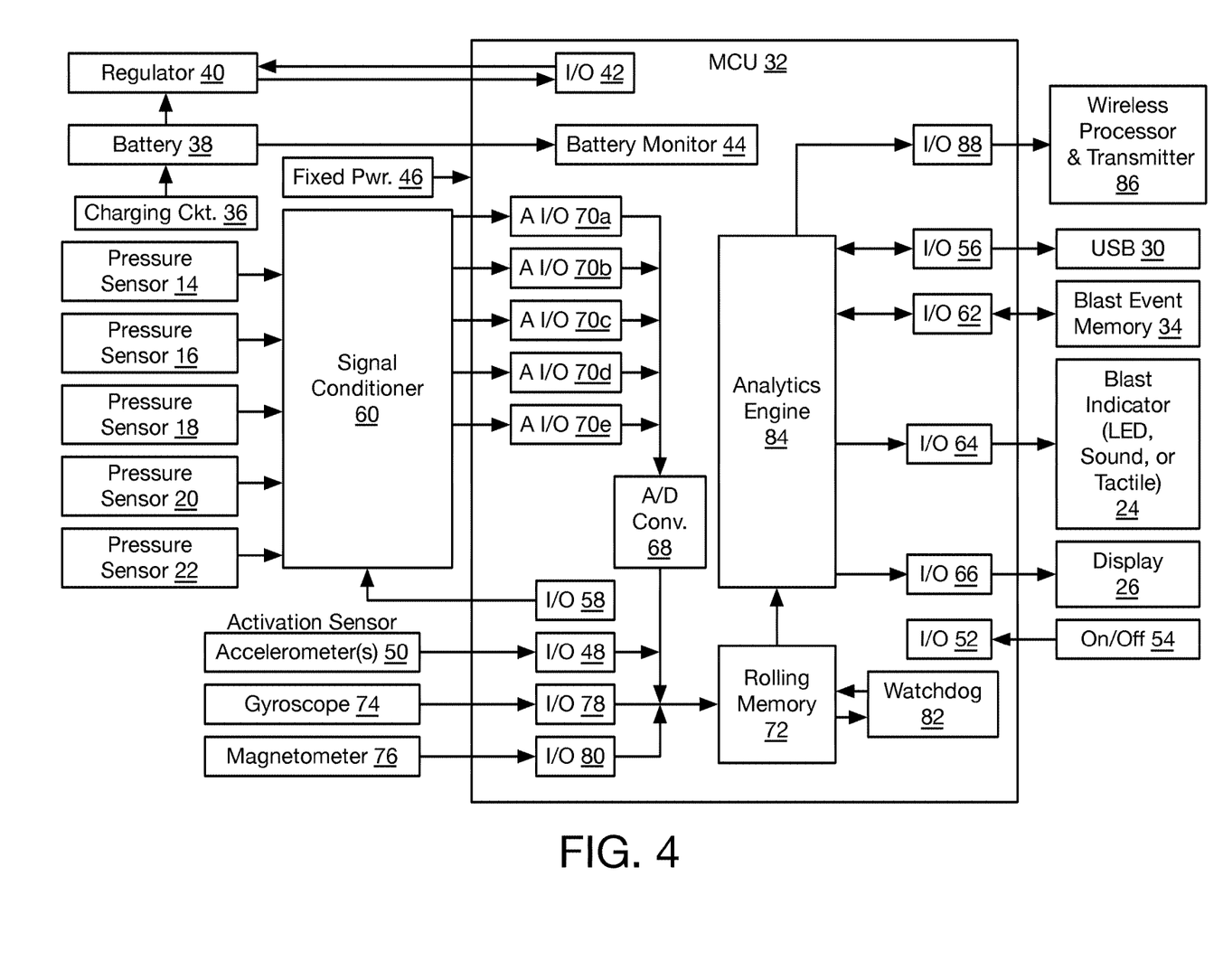
FIG. 4 is a block diagram showing illustrative electronic circuitry of a wearable multi-directional blast sensor in accordance with an aspect of the invention.
Figure 5A:
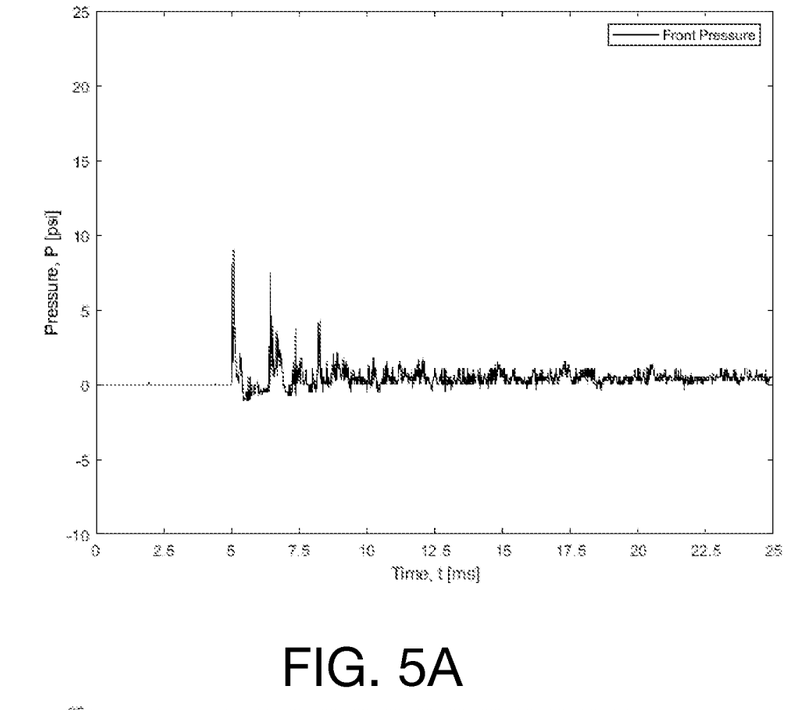
FIGS. 5A through 5E are graphs of pressure vs. time that shows sample blast pressure data pressure histories from one blast event recorded from multiple pressure sensors by a single wearable multi-directional blast sensor in accordance with an aspect of the present invention.
Figure 5B:
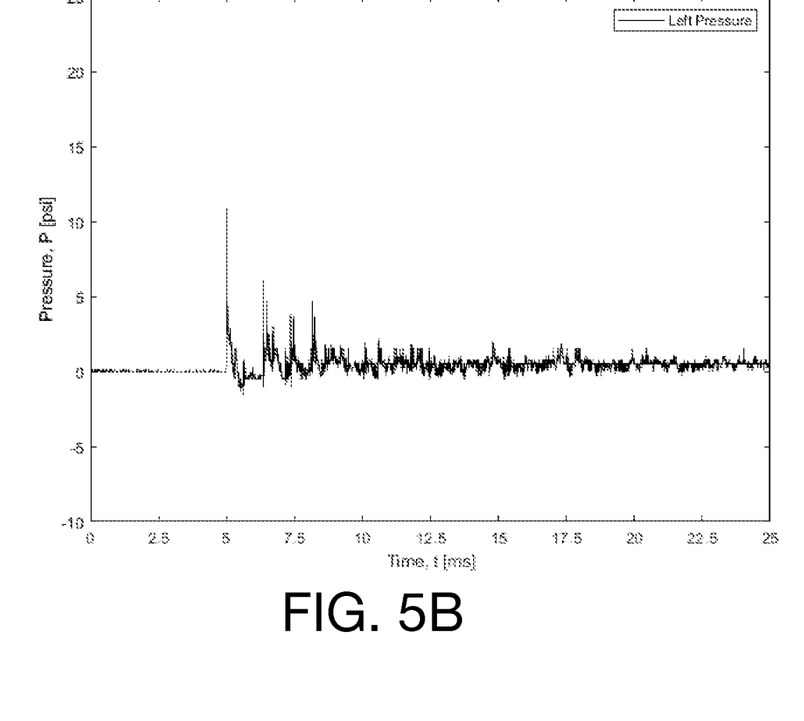
Figure 5C:
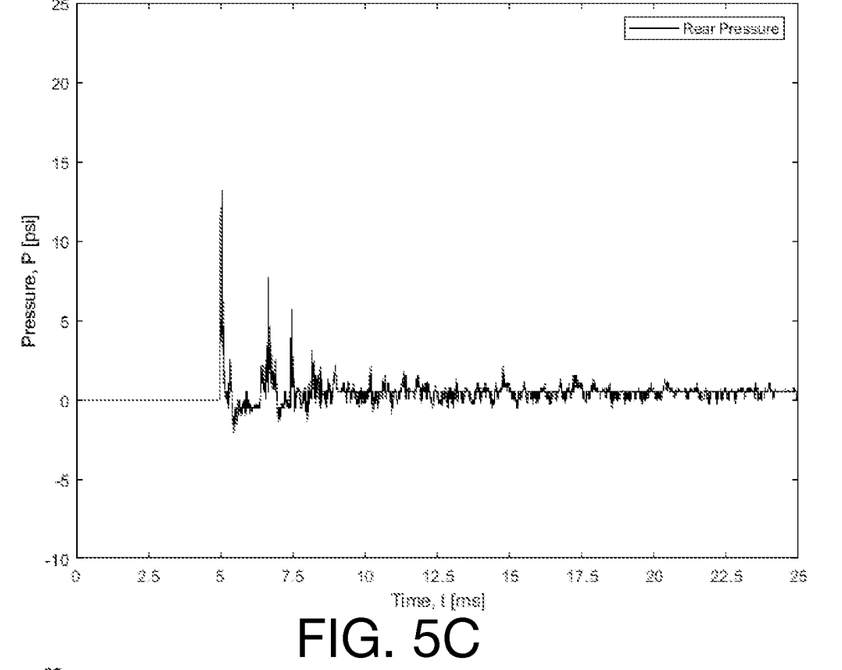
Figure 5D:
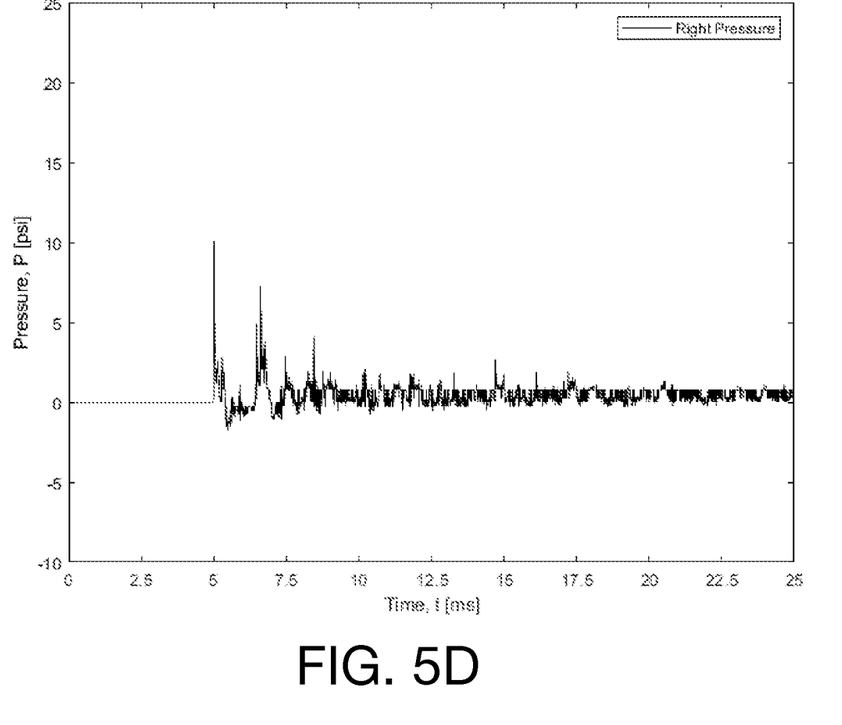
Figure 5E:
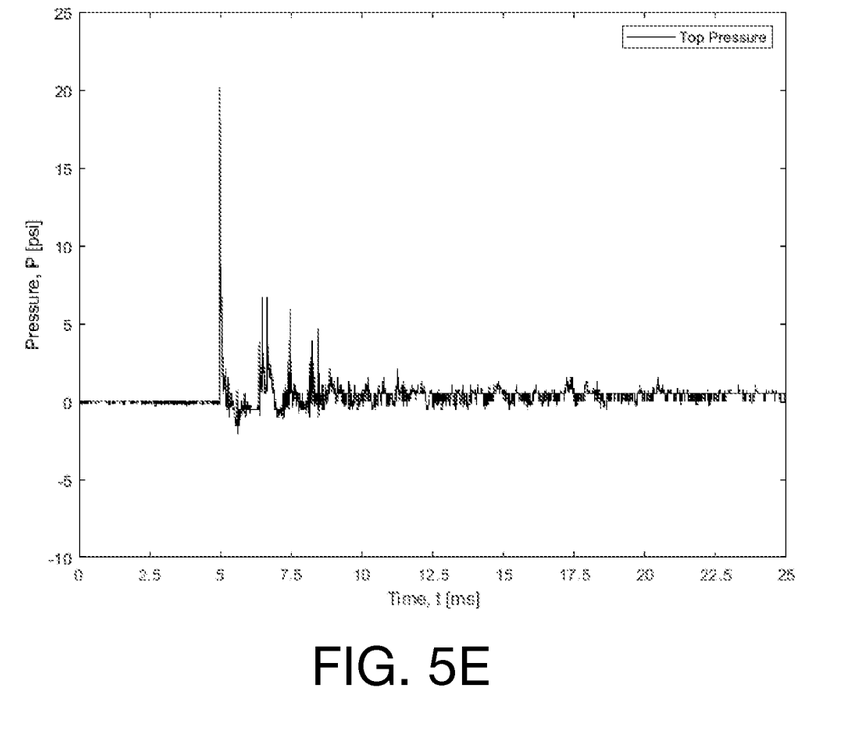

Referring now to FIG. 4, a block diagram shows electrical components contained in the MDBS 10 in accordance with an illustrative instance of the invention. The microcontroller (MCU) 32 processes and records sensor data to blast event memory 34 and communicates with external devices through digital I/O ports as is known in the art. A charging circuit 36 is used to charge a rechargeable battery 38. As is known in the art, charging can be performed using wired chargers or by wireless inductive charging. A voltage regulator 40 is coupled between the battery 38 and the MCU 32 for regulating the voltage powering the MCU 32. The regulator 40 can be turned on and off using signals from the digital input/output (I/O) 42 for power savings when the sensor is in a low-power sleep operation. Battery voltage is monitored through a battery monitor 44 which is internal of the MCU 32.

In some instances of the invention, the MDBS 10 can be set into a fixed power mode as indicated at reference numeral 46, such that the activation sensor (accelerometer) timeout is inactive and all sensors are fully powered at all times. This mode can be set by button press sequence, acceleration sensing of tap or double-tap events, magnetic switching, a wireless command, or other means of inputs. The power for the fixed power mode can be supplied through an external source (e.g., through the USB port 30 or an inductive charger), or from the internal battery 38. The fixed power mode can be used while being worn, when the sensor is placed on structures, or in research type testing. Persons of ordinary skill in the art will appreciate that when power is supplied from the internal battery 38 in the fixed power mode, periodic re-charging of the internal battery 38 will be required.

Digital I/O 48 conveys the output of the activity sensors (triaxial accelerometers) 50 to the MCU 32. Digital I/O 52 is coupled to an On/Off switch 54. Digital I/O 56 provides a USB interface port 30. Digital I/O 58 communicates with the signal conditioner 60. Digital I/O 62 communicates with the blast event memory 34. Digital I/O 64 controls the blast indicator 24. Digital I/O 66 drives the digital display 26.

When power is supplied by a battery 38, the MCU 32 may be maintained in a low power operating mode until output from the activation sensor 50, (which in one instance of the invention is a triaxial (X, Y, and Z) accelerometer), exceeds a turn-on threshold to trigger an interrupt, indicating that the helmet 30 (or other object to which the MBDS 10 is attached) is in use. As long as the output from the activation sensor 50 indicates that the MBDS 10 is in use, power is supplied to the signal conditioner 60 through the digital output 58 to power and condition the outputs of the pressure sensors 14, 16, 18, 20, and 22 by amplifying the voltage outputs an applying analog noise filtering below, for example 200-300 Hz.

If the output from the activation sensor 50 falls below a threshold (which may or may not be the same as the turn-on threshold) for a predetermined period of time indicating that the MBDS is not being worn by an active user, the MCU 32 enters the low-power operating mode, and power to the signal conditioner 60 is turned off In one illustrative but non-limiting instance of the invention this predetermined period of time may be 10 minutes. This parameter is a design-dependent variable that can be specified by the system designer.

The signals from the front pressure sensor 14, left pressure sensor 16, rear pressure sensor 18, right pressure sensor 20, and top pressure sensor 22 are conditioned by the signal conditioner 60 to provide five individual analog voltages through analog I/O circuits 70a through 70e to the A/D converter 68 in the MCU 32 which converts them to digital values. In one instance of the invention, a 12-bit A/D converter may be used. In instances of the invention, the sampling rate for each pressure sensor can be between 50 KHz and 2 MHz or higher limited by the conversion speed of the A/D converter 68. In one non-limiting instance of the invention, a sampling rate of 400 KHz has been used. The conditioned digitized values representing the outputs of the front pressure sensor 14, left pressure sensor 16, rear pressure sensor 18, right pressure sensor 20, and top pressure sensor 22 are clocked into a continuous rolling memory buffer 72 which in one instance of the invention may be a FIFO buffer. In other instances of the invention the rolling memory can be a clocked RAM whose highest address value rolls over to zero.

Acceleration readings can be translational and rotational from both accelerometers (e.g., three-axis accelerometers) and gyroscopes 74 (e.g., three-axis gyroscopes). In some instances of the invention, a first accelerometer may be used as an activation sensor and a second accelerometer having a dynamic range higher than that of the first accelerometer may be used to measure acceleration as a blast parameter. The output of the gyroscope 74 can also be used in place of or in addition to the accelerometer 50 as an activation sensor to wake up the MCU 32. A magnetometer 76 may be included to provide compass orientation data. The outputs of accelerometers 50, gyroscopes 74, and magnetometers 76 are typically digital and the I/O circuits 48 (accelerometer), 78, (gyroscope) and 80 (magnetometer) may implement suitable digital communication protocols for such digital signals, such as but not limited to I2C bus circuits. In example instances of the invention, the sample rate for the gyroscopes 74 and magnetometer 76 is lower and in one example is 2K samples/sec.

The conditioned digitized values output by the A/D converter 68 representing the outputs of the pressure sensors 14, 16, 18, 20, and 22 are monitored by a watchdog 82, which may be, for example, a digital comparator. If one of the conditioned digitized values exceeds a preset threshold, indicating that a blast event has occurred, an interrupt is triggered, and the contents of the continuous rolling memory buffer are written into blast event memory 34. In some instances of the invention, the threshold may be factory set or user set. Use of the watchdog 82 and rolling memory buffer 72 allows data digitized before, during, and after the interrupt trigger event to be captured. If the preset threshold value of pressure is exceeded, the blast indicator 24 can generate one of a plurality of visual, audible, or tactile outputs to indicate the amplitude of pressure. The use of plurality of visual, audible, or tactile outputs to indicate the amplitude of pressure allows multiple pressure thresholds to be set. Persons skilled in the art will appreciate that a light source providing a larger or smaller number of colors could be employed. The particular ones of the plurality of visual, audible, or tactile outputs which correspond to selected amplitude(s) can be set by the user or preprogrammed by the factory. The voltage signal from the pressure sensors 14, 16, 18, 20, and 22 is converted to pressure by using a conversion constant determined during the calibration of the sensors 14, 16, 18, 20, and 22 and may be displayed on the digital display 26. Data that is recorded on the MDBS can be analyzed internally using the analytics engine 84 in the MCU or can be retrieved using the USB 30 interface or by wireless communication protocols.

In some instances of the invention, a combination of three independent accelerometers oriented orthogonal to each other or a triaxial accelerometer (3D accelerometer, 3-axis accelerometer) is used to measure translational acceleration in the X, Y, and Z-axes. As noted, a combination of three independent gyroscopes oriented orthogonal to each other or a triaxial gyroscope (3D gyroscope, 3-axis gyroscope shown at reference numeral 74 connected through I/O 78) may be used to measure rotational acceleration around the X, Y, and Z-axes. Persons of ordinary skill in the art will appreciate that an inertial measurement unit (IMU) may be used in place of independent accelerometers and gyroscopes to measure triaxial translational and rotational acceleration of the MDBS 10.

The magnetometer shown at reference numeral 76 which may be connected through I/O 80 can be used to measure orientation of the MDBS 10 with respect to true north. The magnetometer 76 provides the information to determine which way the MDBS 10 was pointed during a blast event which can be used to calculate the direction of the blast pressure source and/or the direction the wearer was oriented in during the blast event.

All sensor readings are processed in the analytics engine 84. This can include calculations to drive the blast indicator 24 and display 26. The data may be transferred under the control of analytics engine 84 (or by another engine within the MCU 32) via the USB connection 30 or through a wireless processor and transmitter 86 connected through I/O 88 for further post-processing or viewing.

A sample of blast pressure data recorded on the MDBS with the five individual pressure sensors is shown in FIGS. 5A through 5E. Persons of ordinary skill in the art will observe that the pressure shown on the Y-axis of FIGS. 5A through 5E has been normalized to zero. The total elapsed time on the X-axis is 25 mSec. Note that the pre-blast stable pressure is shown for a period of about 5 mSec.

Figure 6:
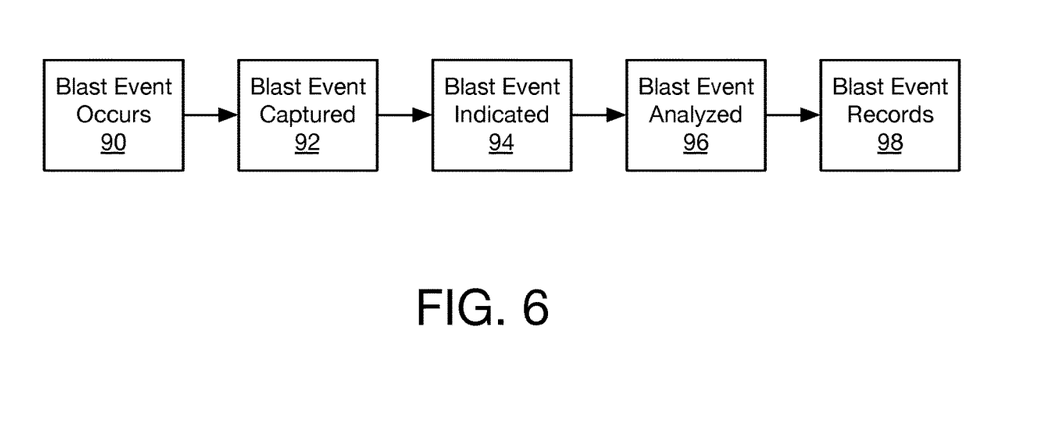
FIG. 6 is a diagram that illustrates the concept of operations of the wearable multi-directional blast sensor.

Referring now to FIG. 6, the concept of operation for the wearable MDBS 10 is illustrated. A blast event 90 occurs and the MDBS 10 captures blast parameters from multiple pressure sensors at 92. The amplitude of blast exposure from either pressure or acceleration is indicated/displayed on the MDBS 10 with a light and/or digital display at 94. Recorded blast data is retrieved via wired or wireless communication and processed at 96 by the MCU or post-processed with blast analysis software on a separate device. The blast analysis software analyzes the recorded blast parameters and calculates the severity of the blast exposure. The analyzed data can be stored in records at 98.

Figure 7:
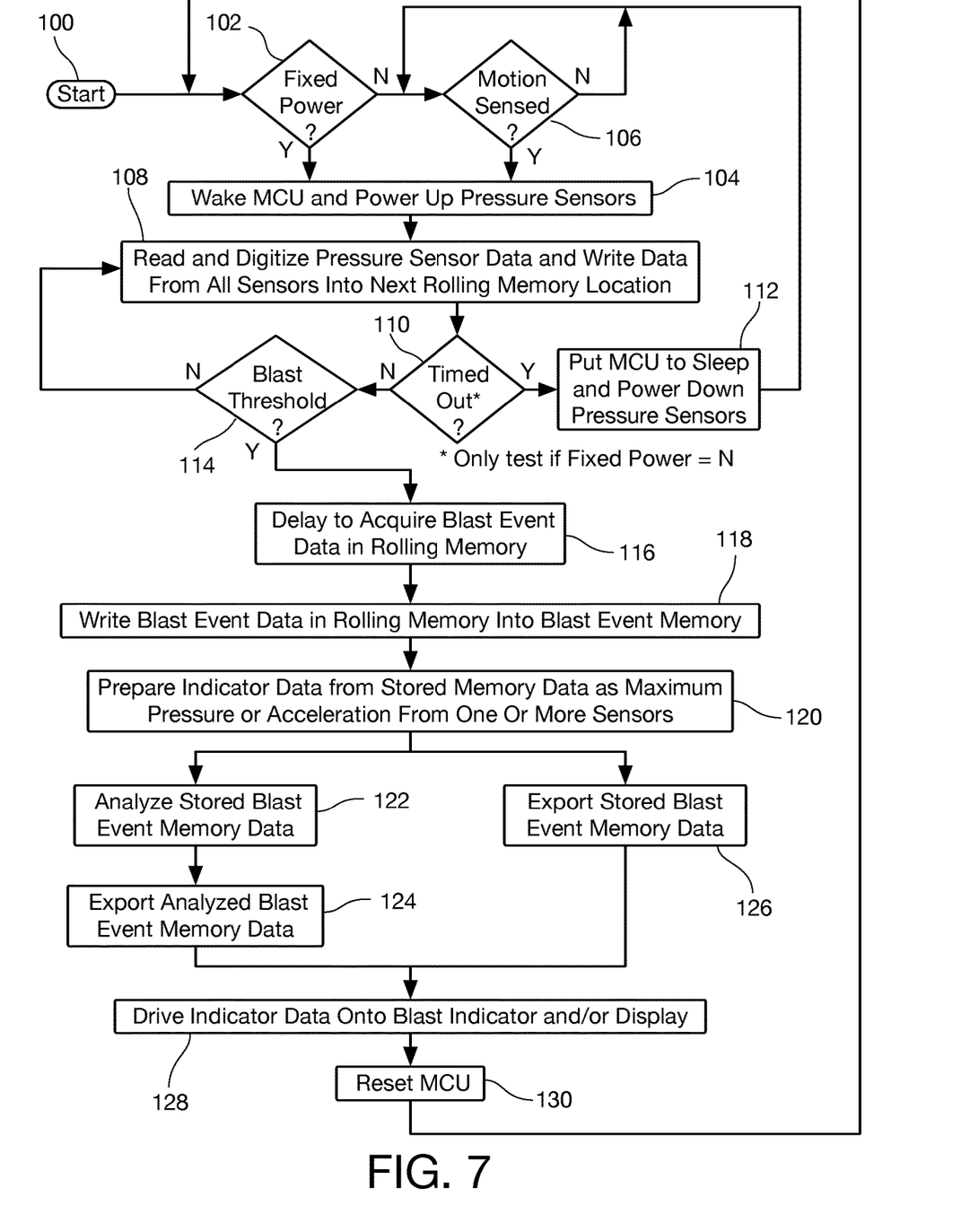
FIG. 7 is a flow diagram that shows in more detail the operation of an illustrative instance of the wearable blast sensor of the present invention.

Referring now to FIG. 7, a flow diagram shows in more detail the operation of an illustrative instance of the wearable MDBS 10 of the present invention. All events depicted in FIG. 8 take place inside of the wearable MDBS 10. The operation begins at reference numeral 100.

At reference numeral 102, the MDBS 10 is examined to determine whether it is in fixed power mode. If at reference numeral 102 it is determined that the MDBS 10 is in fixed power mode or powered by an external power source, operation proceeds to reference numeral 104 where the MCU 32 is awakened and power is provided to the pressure sensors. This mode of operation is particularly useful where the MDBS 10 is deployed on a fixed object such as a building or other structure where motion sensing is not available.

If at reference numeral 102 it is determined that the MDBS 10 is not in fixed power mode or powered by an external power source, operation proceeds to reference numeral 106, where the motion sensor (e.g., the accelerometer 48 and/or the gyroscope 74 in FIG. 4) is continuously polled (e.g., at 2K samples/sec in a non-limiting instance of the invention) to determine if motion has been sensed, indicating that the MDBS 10 is being worn by a user and should be activated. Once motion is sensed the operation proceeds to reference numeral 104 where the MCU is awakened, and power is provided to the pressure sensors.

At reference numeral 108 analog pressure data is read from the pressure sensors and digitized, acceleration and orientation data are read from the accelerometer, and from the gyroscope, and magnetometer sensors (if present), and the data is read into the next rolling memory location at preset intervals. If at reference numeral 102 it has been determined that the MDBS 10 is powered by a battery source, the operation proceeds to reference numeral 110, where the amount of time that has elapsed since the last motion was sensed at reference numeral 106 is compared with a predetermined inactivity time threshold to determine whether the MDBS 10 is being worn and is still in use by a user. If the inactivity time threshold has been exceeded, the operation proceeds to reference numeral 112 where the pressure sensors are powered down and the MCU 32 is put to sleep. The operation then proceeds to reference numeral 106 where the motion sensor is again continuously polled to determine if motion has been sensed, indicating that the MDBS 10 is being worn by a user and is again in use and should be activated.

If at reference numeral 110 the inactivity time threshold has not been exceeded, or if at reference numeral 102 it has been determined that the MDBS 10 is in fixed power mode or is powered by a fixed power source, the operation proceeds to reference numeral 114 where the data from each pressure sensor is compared with a preset threshold to determine if a blast event has occurred. If a blast event has occurred, the operation moves to reference numeral 116 where a delay long enough for the blast event data to be acquired by the rolling memory 70 is observed. In accordance with non-limiting instances of the invention, the delay may be from about 25 mSec to about 1 sec.

The operation then proceeds to reference numeral 118 where the contents of the rolling memory 70 are written into the blast event memory 34. As shown in FIG. 5, the range of memory locations written from the rolling memory 70 into the blast event memory 34 starts at a memory location storing pressure data at a time prior to the blast threshold being detected at reference numeral 114. This assures that the rising edge of the blast pressure wave can be captured by the blast event memory 34. In the non-limiting example of FIG. 5, about 5 mSec of pre-blast pressure data is shown as having been transferred to the blast event memory 34.

The operation then proceeds to reference numeral 120 where indicator data of maximum pressure from one or more sensors is prepared from the stored blast memory data. Next, depending on whether the analysis is to be performed by the MCU 32 or by an external intelligence, the stored blast memory data is either analyzed internally by the analysis engine 74 in the MCU 32 at reference numeral 122 and then the analyzed data is exported to an external device, or is exported to an external engine for analysis at reference numeral 124, or exported to an external analysis engine at reference numeral 126.

Next, at reference numeral 128 the indicator data is driven onto the indicator light and/or onto the display. Finally, at reference numeral 130, the MCU 32 is reset, and the operation returns to reference numeral 102.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A wearable blast sensor for simultaneously measuring blast pressure of a blast event from multiple directions, comprising:

multiple pressure sensors oriented in individual planes in one multi-directional pressure sensor device for simultaneously measuring blast pressure of the blast event from multiple directions;

at least one blast parameter sensor to measure a blast parameter other than pressure from the blast event;

an analog-to-digital converter having an analog input and a digital output, the analog input coupled to the multiple pressure sensors;
a rolling memory buffer coupled to the digital output of the analog-to-digital converter;
at least one controller coupled to the rolling memory and configured to:
store a time sequence of digital pressure signals from the digital output of the analog-to-digital converter;
write into a blast event memory data from the rolling memory buffer including data corresponding to the blast event if one of the digital pressure signals exceeds a set first threshold;
generate a first blast magnitude indicator signal if any of the digital pressure signals exceeds a second set threshold.

2. The wearable blast sensor of claim 1 wherein:
all of the multi-directional pressure sensors, the at least one blast parameter sensor, the memory, the at least one controller are sealed within in a housing; and
at least one attachment device is coupled to the housing for mounting on a person or an object.

3. The wearable blast sensor of claim 2, wherein the housing is comprised of a single material, or a plurality of materials wherein the material surrounding the sensors has an acoustic impedance compatible with a medium in which the blast event is being measured.

4. The wearable blast sensor of claim 1 further comprising at least one sensory indicator responsive to the blast magnitude indicator signal to indicate blast exposure magnitude.

5. The wearable blast sensor of claim 4 wherein the at least one sensory indicator is one of a visual, an audible, or a tactile sensory indicator.

6. The wearable blast sensor of claim 1 wherein the controller is further configured to generate a second blast magnitude indicator signal if any of the digital pressure signals exceeds a third set threshold.

7. The wearable blast sensor of claim 6 further including at least one sensory indicator to provide a first indication of blast exposure magnitude in response to the first blast magnitude indicator signal and a second indication of blast exposure magnitude in response to the second blast magnitude indicator signal.

8. The wearable blast sensor of claim 7 wherein the at least one sensory indicator is one of a visual, an audible or a tactile sensory indicator.

9. The wearable blast sensor of claim 1 further including at least one display to display at least one of blast exposure magnitude in response to the first blast magnitude indicator signal.

10. The wearable blast sensor of claim 9 wherein the at least one display further displays one of battery levels, or different states and/or modes of operation of the wearable blast sensor.

11. The wearable blast sensor of claim 6, further including at least one display to display blast exposure magnitude in response to the first blast magnitude indicator signal and blast exposure magnitude in response to the second blast magnitude indicator signal.

12. The wearable blast sensor of claim 11 wherein the at least one display further displays one of battery levels, or different states and/or modes of operation of the wearable blast sensor.

13. The wearable blast sensor of claim 1, wherein the controller is further configured to store measured blast pressure data in response to an artificial intelligence/machine learning algorithm processing parameters of a blast event.

14. The wearable blast sensor of claim 1, wherein the at least one blast parameter sensor is one of an accelerometer and a gyroscope.

15. The wearable blast sensor of claim 1 wherein the controller is configured to write into an internal blast event memory.

16. The wearable blast sensor of claim 1 wherein the controller is configured to write into an external blast event memory.

17. The wearable blast sensor of claim 14, further including circuitry to write into the external blast event memory using one of wireless or wired communication.

18. The wearable blast sensor of claim 1, wherein the controller is further configured to calculate a resultant pressure and directionality of the blast from analysis of the pressure history from the multiple pressure sensors contained in the pressure sensor device.

19. The wearable blast sensor of claim 2, wherein the controller is configured to generate the first blast magnitude indicator signal as a function of one of single sensor blast pressure, computing blast pressure from a combination of some sensors or all pressure sensors on the device, and calculating a resultant pressure and directionality of the blast event.

20. The wearable blast sensor of claim 2, wherein the controller is configured to generate the first blast magnitude indicator signal as a function of an artificial intelligence/machine learning algorithm based on parameters of the blast event.

21. The wearable blast sensor of claim 1, wherein the MCU is configured to perform blast data analysis in response to sensing the blast event.

22. The wearable blast sensor of claim 1, further comprising:
at least one activation sensor, the MCU configured to enter one of a low power mode and an operating mode in response to signals from the activation sensor.

23. A method for operating a wearable blast sensor having multiple pressure sensors oriented in individual planes in one multi-directional pressure sensor device for simultaneously measuring blast pressure of a blast event from multiple directions, comprising:
affixing the blast sensor to an object;
continually sensing pressure data from multiple pressure sensors oriented in individual planes in one multi-directional pressure sensor device;
continuously storing the sensed pressure data in a rolling memory buffer in the wearable blast sensor;
comparing in the wearable blast sensor the sensed data from each of the multiple pressure sensors with a preset threshold;
identifying in the wearable blast sensor sensed data that exceeds the preset threshold as blast event data;
in response to identifying blast event data, writing a data set from the rolling memory into a blast event memory in the wearable blast sensor, the data set including sensed data stored sequentially from a time prior to the blast event data to sensed data stored from a time after the blast event data.

24. The method of claim 23 further comprising:
continually sensing blast parameter data representing a blast parameter other than pressure from the blast event from a blast parameter sensor; and continuously storing the sensed blast parameter data in the rolling memory; and wherein writing the data set from the rolling memory into the blast event memory, the data set includes writing the sensed blast parameter data.

25. The method of claim 24 further comprising;

examining the data set in the blast event memory to identify maximum pressure blast data; and providing a sensory indicator if amplitude of at least one of the pressure blast data or acceleration blast data exceeds a threshold.

26. The method of claim 23 further comprising analyzing the data set in the blast event memory to calculate at least one of the peak pressure and impulse from all of the multiple pressure sensors, the resultant pressure of the blast with respect to the blast sensor, or the directionality of the blast with respect to the blast sensor.

* * * * *